United States Patent
She et al.

(10) Patent No.: US 10,488,863 B2
(45) Date of Patent: Nov. 26, 2019

(54) AUTONOMOUS VEHICLE POST-FAULT OPERATION

(71) Applicant: Ford Global Technologies, LLC, Dearborn, MI (US)

(72) Inventors: Eric She, Troy, MI (US); Scott J. Lauffer, Northville, MI (US); Jose Lopez, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 403 days.

(21) Appl. No.: 15/377,162

(22) Filed: Dec. 13, 2016

(65) Prior Publication Data

US 2018/0164823 A1    Jun. 14, 2018

(51) Int. Cl.
*G05D 1/00* (2006.01)
*G05D 1/02* (2006.01)
*G07C 5/08* (2006.01)

(52) U.S. Cl.
CPC ......... *G05D 1/0214* (2013.01); *G07C 5/0808* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | |
|---|---|---|---|
| 9,523,984 B1* | 12/2016 | Herbach | B62D 15/025 |
| 2009/0088916 A1 | 4/2009 | Elgersma et al. | |
| 2011/0160950 A1 | 6/2011 | Naderhirn et al. | |
| 2014/0297094 A1 | 10/2014 | Dolgov et al. | |
| 2015/0019063 A1 | 1/2015 | Lu et al. | |
| 2015/0246678 A1 | 9/2015 | Hauler | |
| 2016/0132058 A1 | 5/2016 | Lee | |
| 2017/0008521 A1* | 1/2017 | Braunstein | G01C 21/32 |

FOREIGN PATENT DOCUMENTS

DE    102013213171 A1    1/2015

* cited by examiner

*Primary Examiner* — James M McPherson
(74) *Attorney, Agent, or Firm* — Frank A. MacKenzie; Bejin Bieneman PLC

(57) ABSTRACT

Vehicles can be equipped to operate in both autonomous and occupant piloted mode. Vehicles can be equipped with hardware and software to determine a driving-acceptable region defined by lateral and longitudinal coordinates relative to a first vehicle, wherein the lateral and longitudinal coordinates are based on the locations and sizes of one or more second vehicles and the location and size of a roadway. Upon determining a vehicle fault, a computing device in the vehicle can pilot the vehicle to a stop within the driving-acceptable region.

18 Claims, 6 Drawing Sheets

AUTONOMOUS VEHICLE POST-FAULT OPERATION

BACKGROUND

Vehicles can be equipped to operate in both autonomous and occupant piloted mode. Vehicles can be equipped with computing devices, networks, sensors and controllers to pilot the vehicle and to assist an occupant in piloting the vehicle. A computing device can monitor the operation of the computing devices, networks, sensors and controllers to determine electrical and logical health of the computing devices, networks, sensors and controllers.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle along a roadway or other portions of a path.

Figure 1:
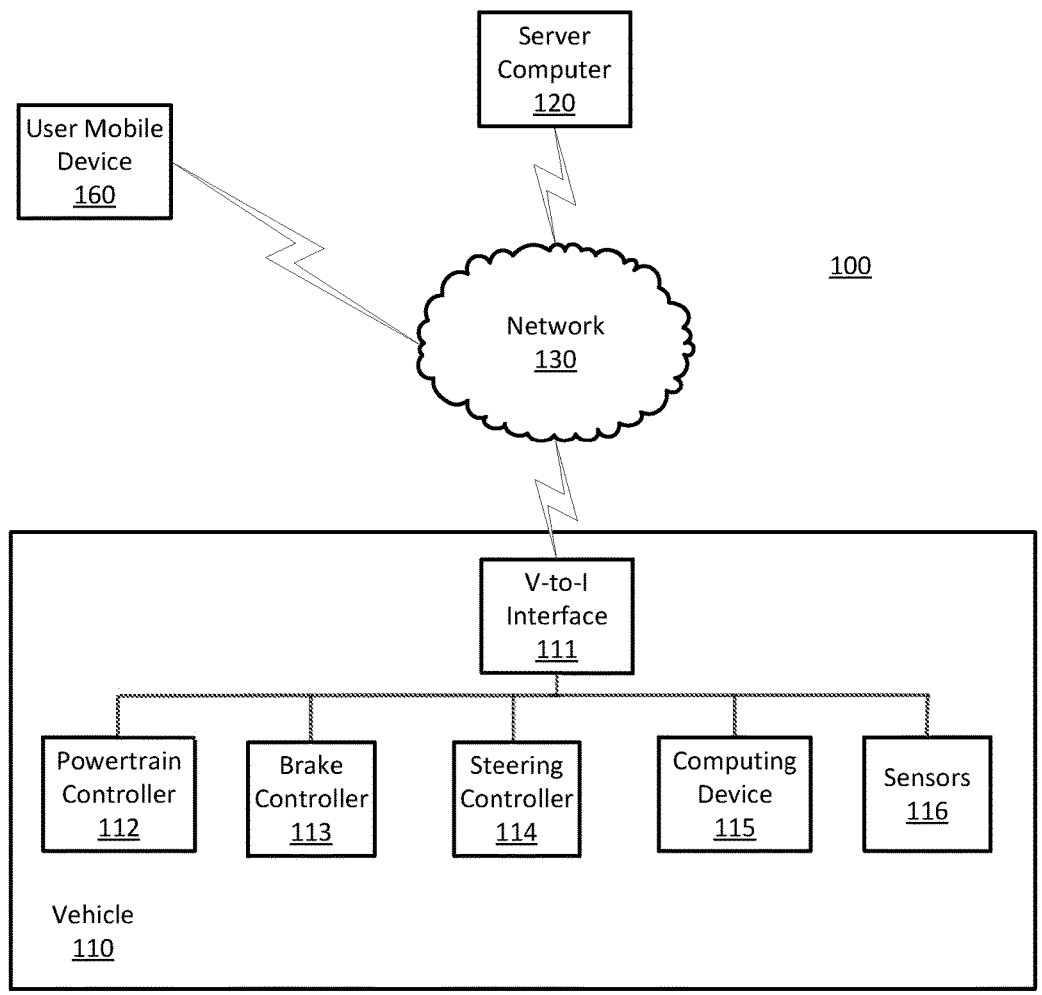
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing device, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
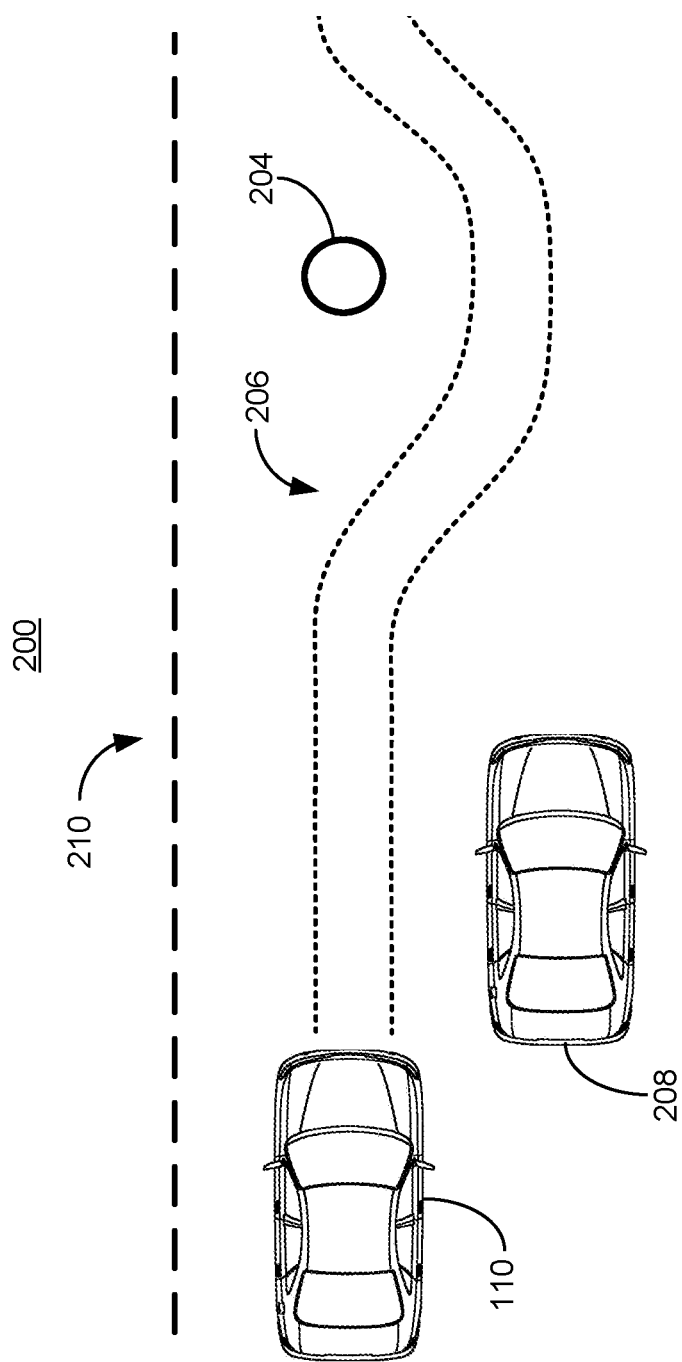
FIG. 2 is a diagram of an example traffic scene.

FIG. 2 is a diagram of a traffic scene 200 including a vehicle 110 traveling on a roadway 210, represented by dashed lines. Vehicle 110 has a location, size, speed and direction that can be determined by a computing device 115 using sensors 116 and V-to-I interface 111 as described above in relation to FIG. 1. Computing device 115 can also determine, using sensors 116 and V-to-I interface 111, the location and size of roadway 210, the location and size of traffic object 204 and location and size of second vehicle 208. Location is defined as the coordinates, in three-dimensional space, of a predetermined point associated with a vehicle 110, second vehicle 208, traffic object 204 or roadway 210. The coordinates can be determined with respect to an absolute reference system, such as latitude, longitude, measured in degrees, minutes and seconds and fractions thereof and altitude, measured in feet.

Figure 3:
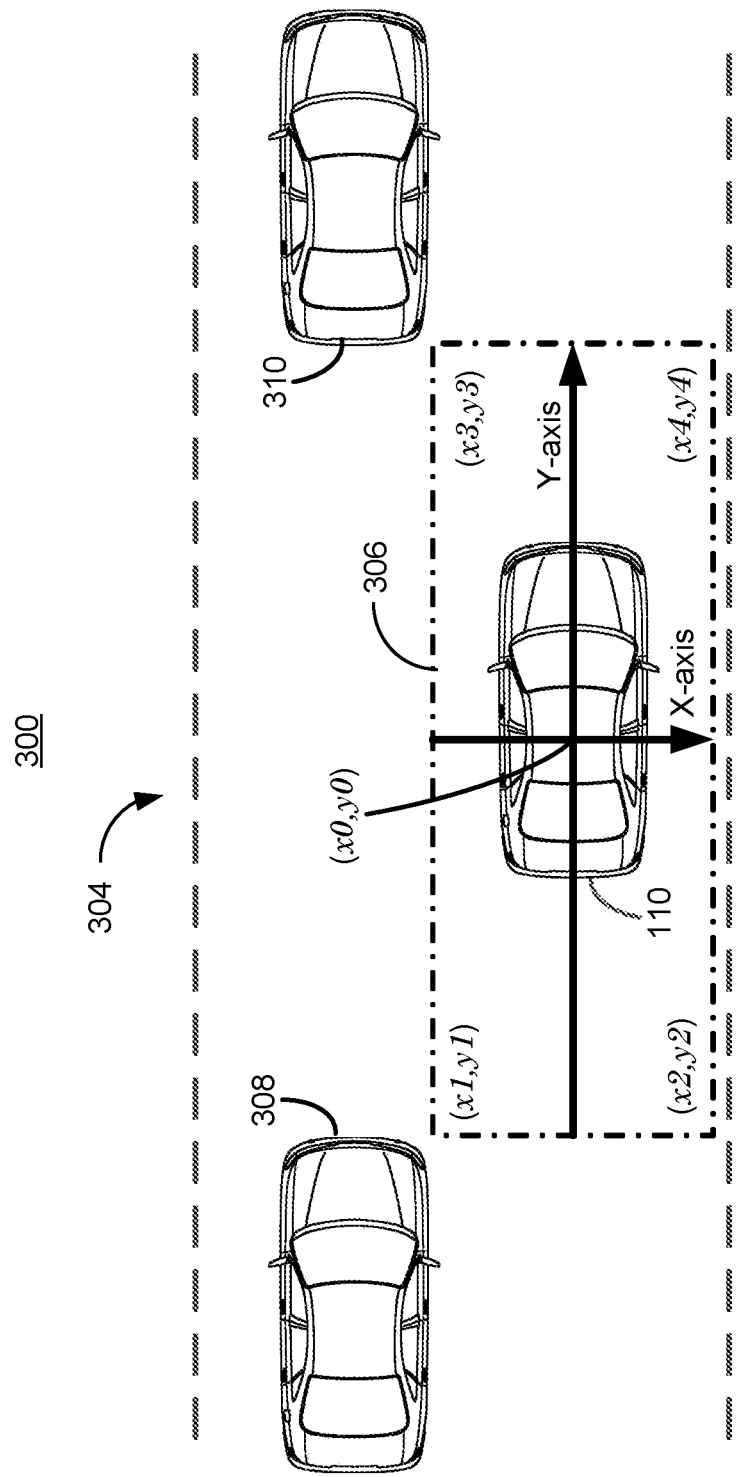
FIG. 3 is a diagram of a second example traffic scene.
Figure 4:
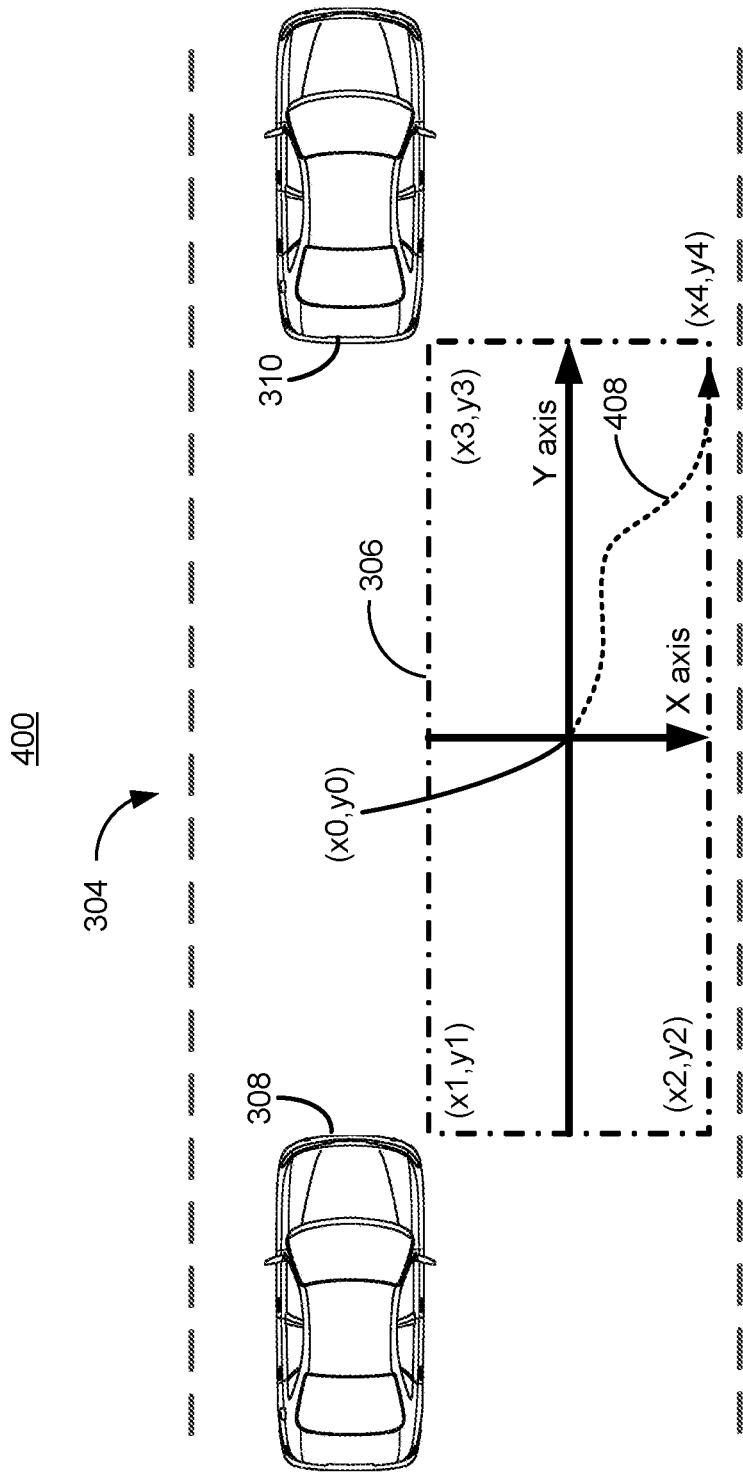
FIG. 4 is a diagram of a third example traffic scene.
Figure 5:
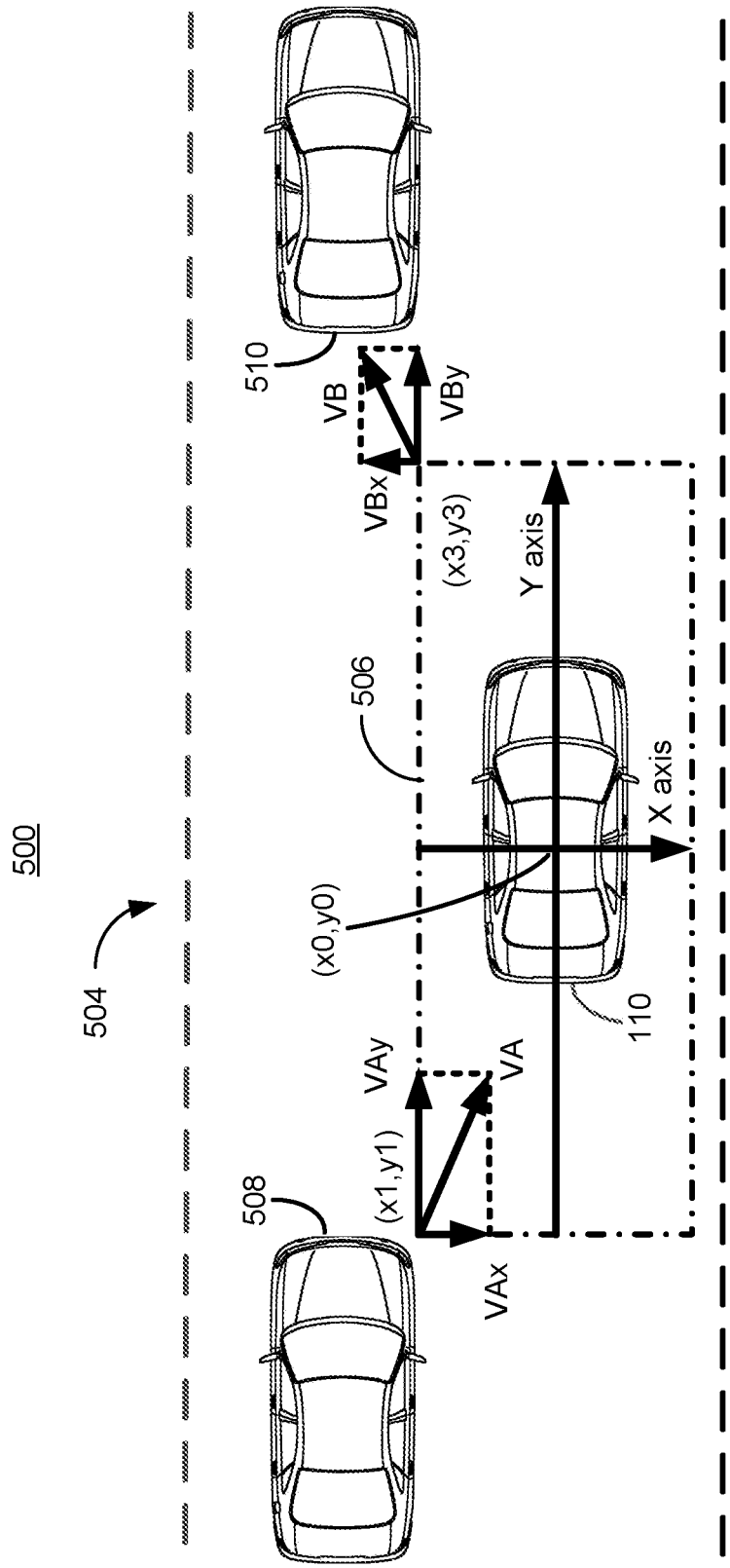
FIG. 5 is a diagram of a fourth example traffic scene.

The coordinates can also be determined with respect to a local reference, for example the point labeled $(x_0,y_0)$ in FIGS. 3, 4 and 5. In this case, it is assumed that the altitude of vehicles 110, 208 and traffic objects is constrained by the altitude of roadway 210 and can therefore be disregarded and the coordinates that define the location of vehicles 110, 208 can be represented by a pair of X, Y coordinates $(x_i,y_j)$, measured in feet with respect to orthogonal X- and Y-axes in a plane parallel to the drivable surface of roadway 210 and relative to a predetermined point $(x_0,y_0)$. The coordinates can also include the orientation β of the vehicle 110, 208 or traffic object 204. In general, orientation β includes three measures of angular rotation about the three axes, X, Y and Z, including altitude, measured in degrees, however, in similar fashion as above, since it is assumed for present purposes that vehicle 110, 208 and traffic object 204 pose is restricted to motion in a plane parallel to the drivable surface of roadway 210, orientation β can be defined as angular rotation in a plane, measured in degrees.

Computing device 115 in a vehicle 110 can determine a long-range driving-acceptable region 206, represented by dotted lines, relative to the vehicle 110 based on the location and size of roadway 210, the location and size of traffic object 204 and location and size of second vehicle 208, for example. Long-range driving-acceptable region 206 can be determined by computing device 115 as a safe trajectory envelope, i.e., an area along a planned or projected path of the vehicle 110 that can be safely traveled, typically an area to the front of the vehicle 110. In other words, a driving-acceptable region 206 is an area of roadway 210 (or other area of possible travel of the vehicle 110) that the computer 115 has determined to be a safe area of travel and within the capabilities of computing device 115 to pilot vehicle 110 safely. A safe trajectory envelope includes the paths upon which vehicle 110 can be estimated by computing device 115 to be able to be piloted safely, given the current location, size, speed and direction of vehicle 110. Long range driving-acceptable region 206 can include information regarding location and size of traffic object 204 and location and size of second vehicle 208.

Traffic object 204 include any physical object that could impede vehicle 110, including a pothole, a barrier, an abutment, a railing, a road sign or any other obstruction, for example. Information regarding the location and size of traffic object 204 and the location, size and speed and direction of a second vehicle 208 can come from sensors 116, for example video or LIDAR sensors, e.g., such information as may be provided via lane-keeping systems, collision avoidance systems, etc., or received via V-to-I Interface 111 from a local area traffic network that can include one or more stationary network interfaces and network interfaces included in traffic object 204 and second vehicle 208, for example.

Computing device 115 can represent long-range driving-acceptable region 206 as two sets of polynomial equations that can be represented efficiently by two sets of polynomial coefficients. The polynomial equations, including the coefficients, can be determined based on the speed and direction and limited by a predetermine maximum rate of directional change and a predetermined minimum stand-off distance from objects such as traffic object 204 or other vehicles 208. Computing device 115 can direct controllers 112, 113, 114 to pilot vehicle 110 to maintain a portion of the vehicle, such as a centroid, within the long-range driving-acceptable region 206, for example. The long-range driving acceptable region 206 can be periodically updated based on new information from sensors 116 or the V-to-I interface 111.

The two sets of polynomial equations can each be represented by an equation with the form:

$$y = a_i x^i + \ldots + a_2 x^2 + a_1 x + a_0 \quad (1)$$

where x and y are distances measured in a plane parallel to the drivable surface of roadway 210, typically measured in absolute terms in degrees of latitude and longitude or in feet with reference to a location of a portion of vehicle 110, for example. The value of i can be predetermined to limit the number of coefficients to be calculated based on the size of the long-range driving-acceptable region 206 and predetermined limits on rates of change in vehicle 110 direction and speed. The polynomial coefficients $a_i, \ldots a_2, a_1, a_0$ can be obtained by curve fitting, for example using least-squares techniques, wherein the polynomial equations are fit to at least i+1 cardinal points associated with a predicted path determined by computing device 115. The cardinal points can be associated with changes in direction in a predicted vehicle 110 path or at predetermined intervals along a predicted vehicle 110 path, for example.

In one case, second vehicle 208 can be parked, in which case piloting vehicle 110 can include directing steering controller 114 to keep vehicle 110 within long-range driving-acceptable region 206, thereby avoiding both traffic object 204 and second vehicle 208 while adjusting speed via braking torque and propulsive torque via controllers 112, 113 if required to keep centripetal forces associated with changing vehicle 110 direction within predetermined limits. In this way, vehicle 110 can be piloted on a path that avoids both traffic object 204 and second vehicle 208 while minimizing delay.

In cases where second vehicle 208 is moving in traffic with vehicle 110, computing device 115 can determine braking torque, propulsive torque and steering via controllers 112, 113, 114 required to pilot vehicle 110 within long-range driving-acceptable region 206 in such a fashion as to avoid traffic object 204 and moving second vehicles 208. For example, computing device 115 can direct vehicle 110 to slow down or stop until second vehicles 208 has passed the traffic object 204 before piloting vehicle 110 around traffic object 204 within long-range driving-acceptable region 206.

FIG. 3 is a diagram of a traffic scene 300 including a vehicle 110 on a roadway 304, represented by dashed lines, and a short-range driving-acceptable region 306, represented by dotted-dashed lines, associated with vehicle 110. Long-range driving-acceptable regions include a safe trajectory envelope for determining paths for vehicle 110, and can also therefore be referred to as "path-acceptable regions." In contrast, short-range driving-acceptable regions area areas around vehicles 110 in which a vehicle 110 could be safely piloted. Short-range driving-acceptable regions can include all nearby regions accessible by, i.e., contiguous with, vehicle 110, including regions on and off the roadway. Short range driving-acceptable regions include regions on and off the roadway to provide paths for safe piloting to computing device 115 in cases where vehicle 110 can be directed to pull off the roadway and park and cases where vehicle 110 can be directed by computing device 115 to avoid a stopped vehicle 308, 310 or a traffic object 204, for example.

Short-range driving-acceptable region 306 can be described by a polygon, in this case a rectangle. A rectangle is typically used because a rectangle can include nearby regions on and off the roadway within which vehicle 110 can be safely piloted, and can be represented efficiently by its four vertices, labeled $(x_1,y_1)$, $(x_2,y_2)$, $(x_3,y_3)$ and $(x_4,y_4)$. The four vertices $(x_1,y_1)$, $(x_2,y_2)$, $(x_3,y_3)$ and $(x_4,y_4)$ are determined with respect to an X, Y coordinate system with origin at $(x_0,y_0)$ and X and Y coordinates measured in ft. with respect to the so-labeled X-axis and Y-axis in traffic scene 300. The centroid of the short-range driving-acceptable region 306 is at the point labeled $(x_0,y_0)$ and is at the intersection of the X-axis and Y-axis used to define the vertices of the short range driving-acceptable region 306.

The centroid of the short-range driving-acceptable region 306 is typically made to coincide with a centroid of vehicle 110, for example. The X-axis can be determined to be parallel to vehicle 110 direction of travel and the Y-axis perpendicular to vehicle 110 direction of travel, for example. The short-range driving-acceptable region 306 represents an area within which vehicle 110 can be safely piloted to a stop by computing device 115 in the event of a vehicle fault. By continuously determining an updated short-range driving-acceptable region 306, computing device 115 is prepared to pilot vehicle 110 to a safe stop in the event that onboard diagnostics in computing device 115 cannot determine that 99.9% or greater probability of safe piloting of vehicle 110 exists.

Onboard diagnostics in computing device 115 are defined as a portion of software and hardware that can determine the accuracy and reliability of other portions of vehicle 110 software and hardware including computing device 115, sensors 116, V-to-I interface 111 and controllers 112, 113, 114. Onboard diagnostics can test portions of vehicle 110 hardware and software to determine a probability, expressed as a percentage, that vehicle 110 software and hardware is operating within predetermined tolerances of predetermined values and can therefore pilot vehicle 110 safely. Computing device 115 can require that onboard diagnostics determine that vehicle 110 software and hardware have a 99.9% or greater probability of piloting vehicle 110 safely.

Traffic scene 300 includes second and third vehicles 308, 310. Computing device 115 can determine points $(x_1,y_1)$ and $(x_3,y_3)$ that form two vertices of short-range driving-acceptable region 306 by determining the location and size of second and third vehicles with respect to vehicle 110. Information regarding the location and size of second and third vehicles 308, 310 can come from sensors 116, for example video or LIDAR sensors, or received via V-to-I Interface 111 from local area networks that can include stationary network interfaces and network interfaces included in second and third vehicles 308, 310.

Points $(x_1,y_1)$ and $(x_3,y_3)$ of short-range driving-acceptable region 306 can be determined to be a predetermined distance away from the closest portions of second and third vehicles 308, 310 to point $(x_0,y_0)$, for example. Points $(x_2,y_2)$ and $(x_4,y_4)$ can be determined by detecting the edge of roadway 304 based on sensors 116 or information received from local area networks via V-to-I Interface 111, for example. Short-range driving-acceptable region 306 can be periodically updated by computing device 115 to adapt short-range driving-acceptable region 306 to changes in traffic scene 300 including changing locations of second and third vehicles 308, 310 with respect to vehicle 110.

As discussed above in relation to FIG. 1, computing device 115 can determine the connectivity between components and electrical and logical health of vehicle 110. A vehicle fault can occur when computing device 115 determines that the electrical and logical health of vehicle 110 is not within a predetermined tolerance of a predetermined value, for example. Some vehicle faults can indicate that computing device 115 cannot predict safe operation of vehicle 110 with a high probability to permit operation of vehicle 110 in autonomous mode. A high probability is defined as a 99.9%, or greater, probability that computing device 115 can safely pilot vehicle 110, as determined by onboard diagnostics included in computing device 115. Examples of vehicle faults that indicate unsafe operation of vehicle 110 include missing sensor 116 data, including failure of video cameras or LIDAR sensors, communication errors in V-to-I interface 111 or software error conditions in computing device 115, for example.

FIG. 4 is a diagram of traffic scene 400, which is the same as traffic scene 300 except that vehicle 110 is removed for clarity. If computing device 115 determines that a vehicle fault exists and that safe operation of vehicle 110 cannot be predicted with sufficiently high probability to permit safe autonomous operation, computing device 115 direct vehicle 110 to stop at a predetermined location with respect to short-range driving-acceptable region 306. Path 408 is an example of a path that computing device 115 can direct vehicle 110 to travel to a stop upon determining a vehicle fault exists.

Path 408 represents the successive locations of the centroid of vehicle 110 as computing device attempts to direct vehicle 110 to move from point $(x_0,y_0)$ to point $(x_4,y_4)$ along the path p described by equation 2:

$$p = \sqrt{x_4^2 + y_4^2} \quad (2)$$

Equation 2 is the Euclidian distance between point $(x_0,y_0)$ and point $(x_4,y_4)$ and therefore path p represents the shortest path between the two points. In practice, while computing device 115 can direct controllers 112, 113, 114 to pilot vehicle 110 on path p represented by equation 1, because of differing response in the X and Y directions by vehicle 110 to latitudinal and longitudinal control, path 408 is the path that vehicle 110 travels. Lateral and longitudinal control are the vector components, determined with respect the X-axis and Y-axis, of steering, propulsive and braking torque applied via controllers 112, 113, 114 in controlling vehicle 110, and are measured in newtons by computing device 115. Applying latitudinal and longitudinal control intended to pilot vehicle along path p as described in equation 1 can result in the actual movement of vehicle 110 traveling path 408 based on vehicle 110 response to lateral and longitudinal control. Lateral and longitudinal control by computing device 115 can direct the rate of change in direction along the X-axis and Y-axis independently.

Alternatively, vehicle 110 can define its desired orientation first and then calculate desired coordinate within polygon boundary. For example, assuming polygon vertices are $(x_1,y_1)$, $(x_2,y_2)$, ... $(x_n,y_n)$ and $x_1 <= x_2 <= x_3 <= x_n$. The desired orientation is β with respect to X-axis. The orientation β can be calculated using polygon vertices $(x_1,y_1)$, $(x_2,y_2)$, $(x_3,y_3)$ and $(x_4,y_4)$ in traffic scene 400 of FIG. 4. First, the computer 115 can calculate angle information for each vertex:

$$\beta_1 = \tan^{-1} \frac{y1}{x1} \quad (3)$$

$$\beta_2 = \tan^{-1} \frac{y2}{x2}$$

$$\beta_3 = \tan^{-1} \frac{y3}{x3}$$

Next, find the two adjacent vertices that the orientation β falls between. If $(x_i,y_i)$, $(x_j,y_j)$ are the two adjacent vertices, a boundary polygon can be calculated as:

$$y = \frac{y_j - y_i}{x_j - x_i} x + \frac{y_j x_j - y_i x_i}{x_j - x_i} \quad (4)$$

The desired latitudinal and longitudinal position can then be calculated as:

$$x_1 = \frac{b}{\tan\beta - k} \text{ where } k = \frac{y_j - y_i}{x_j - x_i} \quad (5)$$

and $$y_1 = \frac{b\tan\beta}{\tan\beta - k} \text{ where } b = \frac{y_i x_j - y_j x_i}{x_j - x_i} \quad (6)$$

Latitudinal position $y_1$ and longitudinal position $x_1$ are determined with respect to the center of the short-range driving-acceptable region 306 $(x_0,y_0)$ which can be updated as vehicle 110 moves with respect to roadway 304 and second and third vehicles 308, 310, since all three vehicles 110, 308, 310 can be moving. Computing device can direct vehicle 110 to desired latitudinal position $y_1$ and longitudinal position $x_1$ assuming the desired position $(x_1,y_1)$ is still within the new short-range driving-acceptable region 306. In cases where the desired position $(x_1,y_1)$ falls outside of the new short-range driving-acceptable region 306, for example, when a second or third vehicle 308, 310 changes position and computing device 115 determines a new short-range driving-acceptable region 306, computing device 115 can re-calculate $(x_1,y_1)$ using equations 5 and 6 with new values that reflect the new short-range driving-acceptable region 306.

FIG. 5 is a diagram of a traffic scene 500 including a vehicle 110 moving on a roadway 504. Vehicle 110 is at a location $(x_0,y_0)$ moving in a direction generally parallel to the Y-axis and generally perpendicular to the X-axis at a velocity. Traffic scene also includes second and third vehicles 508, 510, also moving on a roadway 504 and each having a location, size, direction and velocity with respect to vehicle 110. The location, size, direction and velocity of second and third vehicles 308, 310 can be used to predict a short-range driving-acceptable region 506.

Traffic scene 500 includes velocity vectors VA and VB. Velocity vectors VA and VB are the direction and speed with which vertices $(x_1,y_1)$ and $(x_3,y_3)$ are moving based on the location, size, direction and velocity of first and second vehicles 308, 310 respectively. Velocity vectors VA and VB can be described as X and Y component vectors VAx, VAy, VBx, VBy for computational purposes. Computing device 115 can modify short-range driving-acceptable region 506 based on component vectors VAx, VAy, VBx, VBy by firstly, estimating the maximum time t required to reach any point within the original short-range driving-acceptable region 506 and secondly, redefining short-range driving-acceptable region 506 by modifying the two adjacent vertices $(x_1,y_1)$ and $(x_3,y_3)$ using component vectors VAx, VAy, VBx, VBy according to the equations:

$$(x_i, y_i) \rightarrow (x_i + VAx*t, y_i + VAy*t) \quad (7)$$

$$(x_j, y_j) \rightarrow (x_j + VAx*t, y_j + VAy*t) \quad (8)$$

where i=1 and j=3, in the present example.

A orientation β, as defined above in relation to FIG. 2, can be determined by selecting an orientation β that has the lowest probability of causing an impact between vehicle 110 second and third vehicles 508, 510. For example, vehicle 110 can select an orientation β that is oriented towards a point $(x_4, y_4)$, determined to be the point within short-range driving-acceptable region furthest away from second and third vehicles 508, 510.

Computing device 115 can predict a new path 408 for vehicle 110 based on modified short-range driving-acceptable region 506, having a modified a safe area within which vehicle 110 can be safely piloted to a stop by computing device 115 in the event of a vehicle fault. In this way, if computing device 115 detects a vehicle fault, a predicted path 408 is available for use immediately, without delay.

Figure 6:
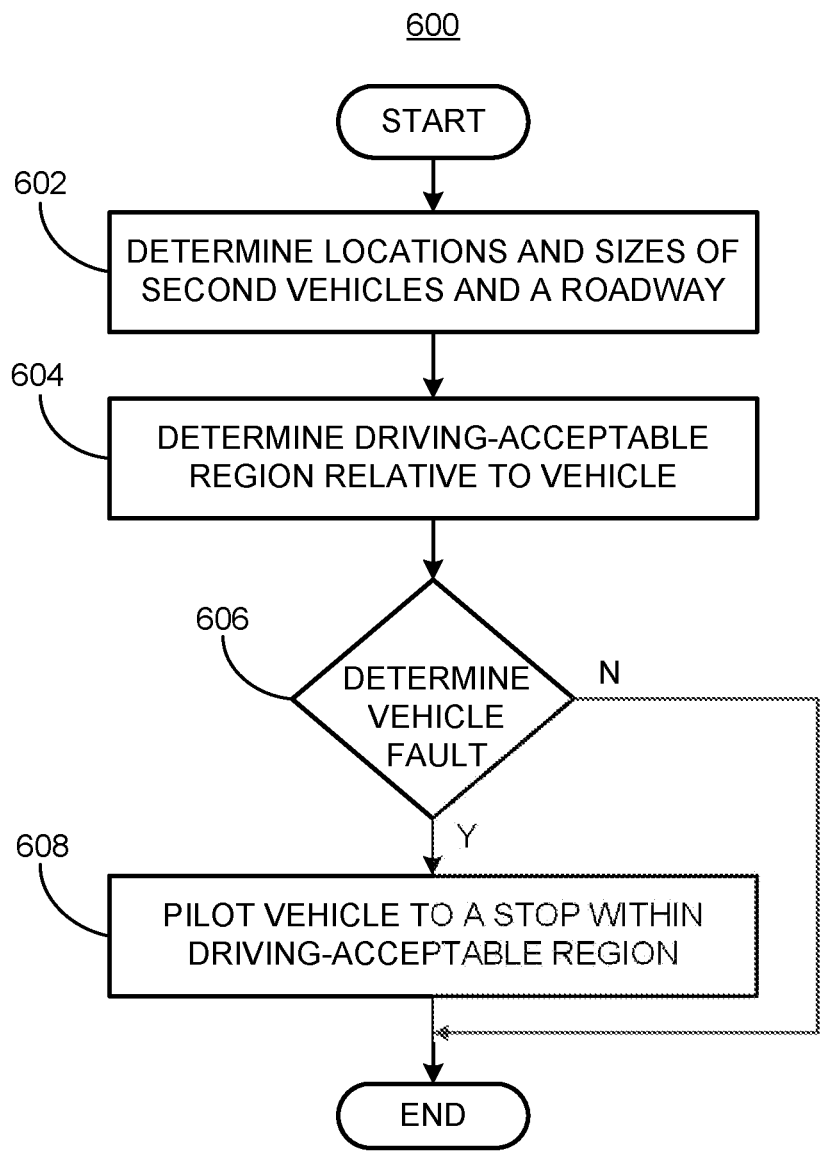
FIG. 6 is a flowchart diagram of a process to pilot a vehicle based on determining a driving-acceptable region.

FIG. 6 is a diagram of a flowchart, described in relation to FIGS. 1-5, of a process 600 for piloting a vehicle by actuating one or more of a powertrain, brake and steering in the vehicle upon determining a transition state. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

At step 602 of process 600, computing device 115 included in a vehicle 110 can determine locations and sizes of one or more second vehicles 308, 310, 508, 510 and the location and size of a roadway 304, 504. Computing device 115 can determine the locations and sizes of one or more second vehicles 308, 310, 508, 510 and the location and size of a roadway 304, 504 based on sensors 116 and V-to-I interface 111 as discussed above in relation to FIGS. 3, 4 and 5.

At step 604 computing device 115 can determine latitudinal and longitudinal coordinates. Latitudinal and longitudinal coordinates can be vertices $(x_1,y_1)$, $(x_2,y_2)$, $(x_3,y_3)$ and $(x_4,y_4)$ as discussed above in relation to FIGS. 3, 4 and 5, for example. Computing device 115 can determine a short-range driving-acceptable region 306, 506 relative to the vehicle 110, 110 as discussed above in relation to FIGS. 3, 4 and 5 based on the latitudinal and longitudinal coordinates.

At step 606 computing device 115 can determine that a vehicle fault exists and that computing device 115 cannot predict with high probability that computing device 115 can pilot vehicle 110, 110 safely in autonomous mode. In this case, at step 608 computing device 115 can pilot vehicle 110, 110 safely to a stop based on a short-range driving-acceptable region 306, 506 determined by the lateral and longitudinal coordinates as discussed above in relation to FIGS. 3, 4 and 5 above, otherwise process 600 ends.

In summary, process 600 is a process by which a computing device 115 can determine locations and sizes of one or more second vehicles and a location and size of a roadway. Computing device 115 can determine latitudinal and longitudinal coordinates relative to a vehicle 110 and then determine a short-range driving-acceptable region 306, 506 based on the latitudinal and longitudinal coordinates. In the event that a vehicle fault occurs wherein computing device 115 cannot predict with greater than or equal to 99.9% probability that computing device 115 can pilot vehicle 110 safely, computing device can pilot vehicle 110 to a safe stop within the short-range driving-acceptable region 306, 506.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining a driving-acceptable region defined by lateral and longitudinal coordinates relative to a first vehicle, including determining two sets of polynomial coefficients based on a location and size of one or more second vehicles, a location and size of the roadway, and a location and size of a traffic object;
   wherein the lateral and longitudinal coordinates are based on a location and size of one or more second vehicles and a location and size of a roadway; and
   upon determining a vehicle fault, piloting the first vehicle to a stop within the driving-acceptable region.

2. The method of claim 1, wherein determining the vehicle fault includes not predicting with greater than or equal to 99.9% probability that hardware and software included in the first vehicle can safely pilot the first vehicle.

3. The method of claim 1, wherein the locations and sizes of the one or more second vehicles and the location and size of the roadway are determined by sensors included in the first vehicle.

4. The method of claim 1, wherein the locations and sizes of the one or more second vehicles are received at the first vehicle via a network interface.

5. The method of claim 1, wherein the traffic object includes potholes, barriers, abutments, railings, road signs and obstructions.

6. A method, comprising:
   determining a driving-acceptable region defined by lateral and longitudinal coordinates relative to a first vehicle;
   wherein the lateral and longitudinal coordinates are based on a location and size of one or more second vehicles and a location and size of a roadway; and
   upon determining a vehicle fault, piloting the first vehicle to a stop within the driving-acceptable region;
   wherein determining the driving-acceptable region includes determining one or more polygons defined by their vertices.

7. The method of claim 6, wherein determining the location and size of the one or more second vehicles includes determining relative location, speed and direction of the one or more second vehicles.

8. The method of claim 6, further comprising:
   modifying the driving-acceptable region based on the relative location, speed and direction of the one or more second vehicles.

9. The method of claim 8, wherein modifying the driving-acceptable region includes vector addition of velocity vectors to one or more vertices.

10. An apparatus, comprising:
    a processor; and
    a memory, the memory storing instructions executable by the processor to:
      determine a driving-acceptable region defined by lateral and longitudinal coordinates relative to a first vehicle, including to determine two sets of polynomial coefficients based on the location and size of one or more second vehicles, the location and size of the roadway and a location and size of a traffic object;
      wherein the lateral and longitudinal coordinates are based on a location and size of one or more second vehicles and a location and size of a roadway; and
      upon determining a vehicle fault, pilot the first vehicle to a stop within the driving-acceptable region.

11. The apparatus of claim 10, wherein determining the vehicle fault includes not predicting with greater than or equal to 99.9% probability that hardware and software included in the first vehicle can safely pilot the first vehicle.

12. The apparatus of claim 10, wherein the locations and sizes of the one or more second vehicles and the location and size of the roadway are determined by sensors included in the first vehicle.

13. The apparatus of claim 10, wherein the locations and sizes of the one or more second vehicles are received at the first vehicle via a network interface.

14. The apparatus of claim 10, wherein the traffic object includes potholes, barriers, abutments, railings, road signs and obstructions.

15. An apparatus, comprising:
    a processor; and
    a memory, the memory storing instructions executable by the processor to:
      determine a driving-acceptable region defined by lateral and longitudinal coordinates relative to a first vehicle;
      wherein the lateral and longitudinal coordinates are based on a location and size of one or more second vehicles and a location and size of a roadway; and
      upon determining a vehicle fault, pilot the first vehicle to a stop within the driving-acceptable region;
      wherein determining the driving-acceptable region includes determining one or more polygons defined by their vertices.

16. The apparatus of claim 15, wherein determining the location and size of the one or more second vehicles includes determining relative location, speed and direction of one or more second vehicles.

17. The apparatus of claim 15, wherein the instructions further include instructions to:
    modify the driving-acceptable region based on the relative location, speed and direction of the one or more second vehicles.

18. The apparatus of claim 17, wherein modifying the driving-acceptable region includes vector addition of velocity vectors to one or more vertices.

* * * * *